Patented Nov. 8, 1938

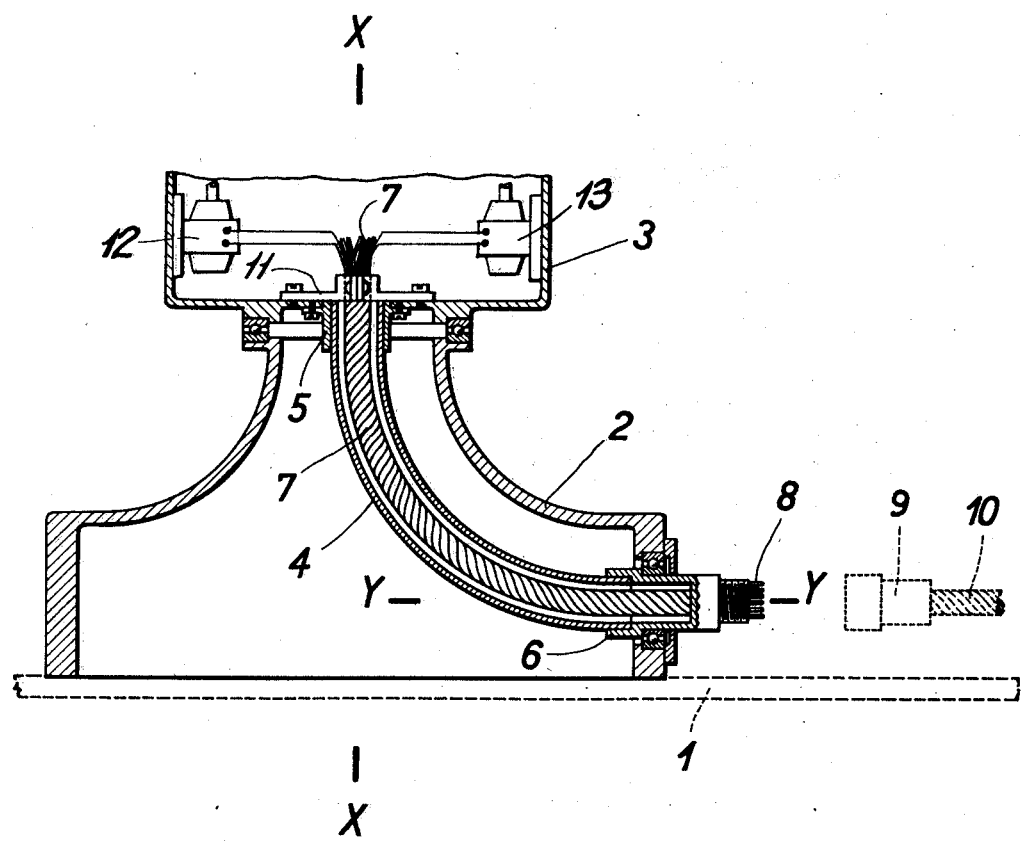

2,135,835

UNITED STATES PATENT OFFICE 2,135,835

DEVICE FOR TRANSMITTING ELECTRIC CURRENTS

Karl Papello, Jena, Germany, assignor to the firm of Carl Zeiss, Jena, Germany

Application January 23, 1937, Serial No. 122,087
In Germany February 5, 1936

3 Claims. (Cl. 173—324)

I have filed an application in Germany, February 5, 1936.

The invention concerns a device for transmitting electric currents between two groups of electric connection parts which are so positioned with respect to an apparatus consisting of a stationary body and a body rotatable relatively to this stationary body that the one group lies within the apparatus and takes part of the rotations of the rotatable body and that the other group lies outside the apparatus and is stationary.

To avoid the rather unreliable and costly power transmission by slip rings in apparatus in which the sense of rotation of the rotatable body is changing frequently, so that this body effects only few rotations in one sense successively, the invention provides that the current-carrying wires inside the apparatus, which are assumed to be connected to a torsion cable lying outside the apparatus and providing the electric connection to the group of electric connection parts outside the apparatus, are disposed in a manner known per se in the interior of a flexible hollow shaft which is fixed to the rotatable body and rotatably mounted in the stationary body and such a cross-sectional area of which as lies outside the apparatus is rigidly connected to the said wires. It is advisable to also connect the said wires to the rotatable body, so as to prevent a rotation of the wires relative to this body. The integrity of the current-carrying wires inside the apparatus, which are generally accessible only with difficulty, is thus guaranteed when the rotatable body is to effect a greater number of successive revolutions in one sense. In the worst case, damages will have to be suffered only by the torsion cable outside the apparatus, which is easily accessible. To provide for easy changes of the torsion cable in the case of such damages, it is convenient to connect this cable to the current-carrying wires lying inside the apparatus by means of an easily accessible detachable plug device whose one member is attached to the shaft or to a sleeve that is rigidly connected to the shaft and through the agency of which this shaft is rotatably mounted on the stationary body, this member preventing at the same time a rotation of the said wires relative to the shaft at the shaft end outside the apparatus.

The accompanying drawing illustrates in elevational section an apparatus constructed according to the invention.

The drawing shows of the apparatus only a stationary lower part 2, which rests on a base plate 1, and an upper part 3 mounted on the lower part 2, so as to be rotatable about a vertical axis X—X. The one end of a flexible hollow shaft 4, which consists of a plurality of superposed helical springs, is rigidly connected to a sleeve 5 fixed to the upper part 3, and the other end of the shaft 4 has a sleeve 6 by means of which the shaft 4 is so mounted in the lower part 2 as to be rotatable about an axis Y—Y intersecting the axis X—X at right angles. In the interior of the shaft 4 are disposed current-carrying wires 7 for supplying current from a feeder lying outside the device 2, 3 to current-consuming parts which are disposed in the rotatable upper part 3 (and of which only two motors 12 and 13 are shown in the drawing). The sleeve 6 is so constructed as to hold the member 8, which forms part of an electric plug device and is connected to the wires 7. The other member 9 of the said plug device is rigidly connected to a torsion cable 10 assumed to be connected to the feeder. This construction of the sleeve 6 prevents the wires 7 from being rotated about the axis Y—Y relatively to the shaft 4. At that end of the shaft 4 which is rigidly connected to the upper part 3, the wires 7 are bundled together by a collar 11. This collar 11 is fixed to the upper part 3, so that the wires 7 are prevented from rotating relatively to this upper part 3.

A rotation of the upper part 3 relative to the lower part 2 about the axis X—X is so transmitted by the flexible hollow shaft 4 to the member 8 of the plug device 8, 9 that to this member is imparted a corresponding rotation relatively to the lower part 2 about the axis Y—Y. This rotation of the member 8 entails a torsion of the cable 10 connected to this member.

I claim:

1. In an apparatus comprising a stationary body and a body rotatably mounted on this stationary body and provided with a group of electric connection parts, wires adapted to connect this group of electric connection parts by means of a torsion cable lying outside the apparatus to another group of electric connection parts stationarily provided outside the apparatus, the aperture through which the said wires enter the stationary body being remote from the aperture through which the wires enter the rotatable body, a flexible hollow shaft adapted to transmit power and so disposed between the said two apertures as to envelop the said wires, this hollow shaft being fixed to the rotatable body and rotatably mounted on the stationary body, and means effecting outside the apparatus a rigid interconnection of the said wires and the said hollow shaft.

2. In an apparatus comprising a stationary body and a body rotatably mounted on this stationary body and provided with a group of electric connection parts, wires adapted to connect this group of electric connection parts by means of a torsion cable lying outside the apparatus to another group of electric connection parts stationarily provided outside the apparatus, the aperture through which the said wires enter the stationary body being remote from the aperture through which the wires enter the rotatable body, a flexible hollow shaft adapted to transmit power and so disposed between the said two apertures as to envelop the said wires, this hollow shaft being fixed to the rotatable body and rotatably mounted on the stationary body, means for rigidly connecting the said wires to the rotatable body, and means effecting outside the apparatus a rigid interconnection of the said wires and the said hollow shaft.

3. In an apparatus comprising a stationary body and a body rotatably mounted on this stationary body and provided with a group of electric connection parts, wires adapted to connect this group of electric connection parts by means of a torsion cable lying outside the apparatus to another group of electric connection parts stationarily provided outside the apparatus, the aperture through which the said wires enter the stationary body being remote from the aperture through which the wires enter the rotatable body, a flexible hollow shaft adapted to transmit power and so disposed between the said two apertures as to envelop the said wires, this hollow shaft being fixed to the rotatable body and rotatably mounted on the stationary body, means effecting outside the apparatus a rigid interconnection of the said wires and the said hollow shaft, and a plug device, the one of the two members of this plug device being rigidly connected to that end of the hollow shaft which lies outside the apparatus, and the other end of this plug device being rigidly connected to the torsion cable.

KARL PAPELLO.